June 19, 1923.

G. L. WAHL

FORCE FEED OILING SYSTEM

Filed July 14, 1921  2 Sheets—Sheet 1

1,459,484

Inventor
George L. Wahl
By his Attorneys

June 19, 1923.
G. L. WAHL
FORCE FEED OILING SYSTEM
Filed July 14, 1921   2 Sheets-Sheet 2
1,459,484
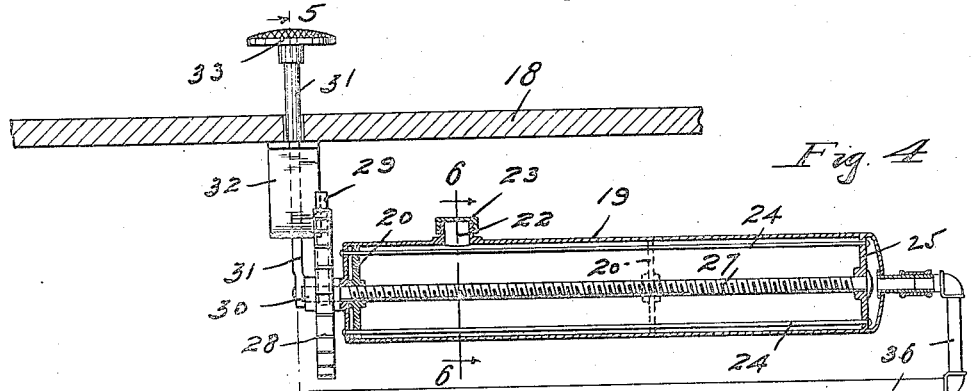
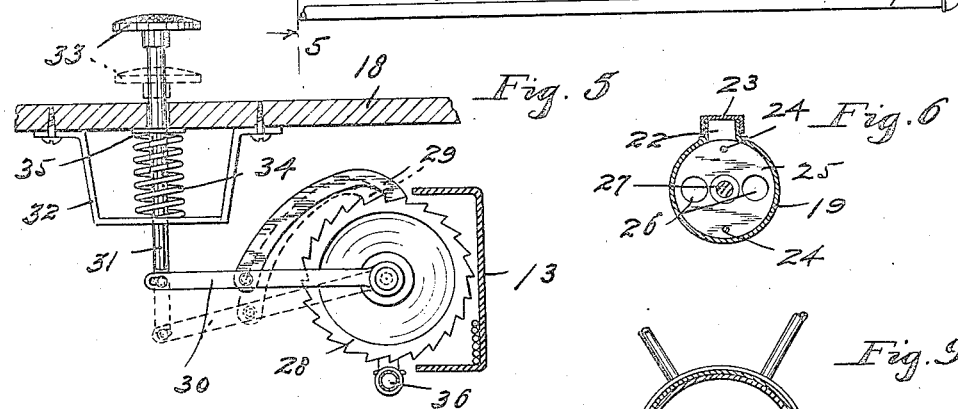
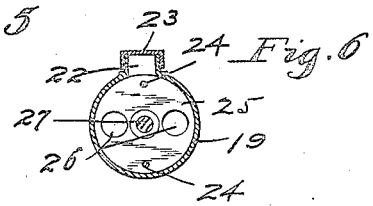
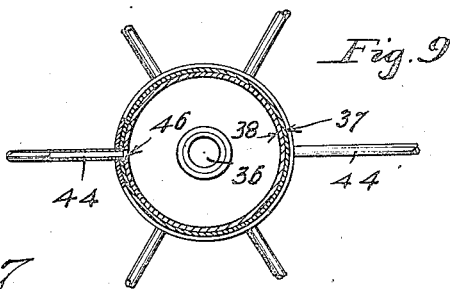
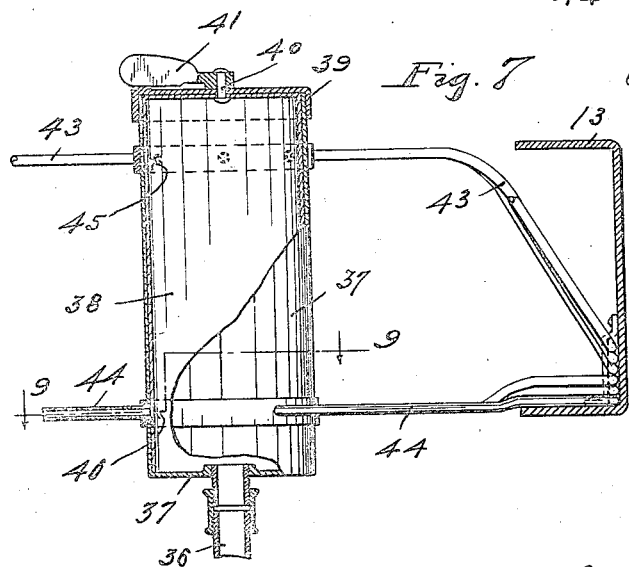
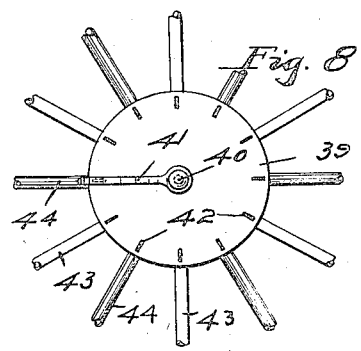
Inventor
George L. Wahl
By his Attorneys Patented June 19, 1923.

1,459,484

UNITED STATES PATENT OFFICE.

GEORGE L. WAHL, OF MINNEAPOLIS, MINNESOTA.

FORCE-FEED OILING SYSTEM.

Application filed July 14, 1921. Serial No. 484,620.

*To all whom it may concern:*

Be it known that I, GEORGE L. WAHL, am a citizen of the United States, residing at Minneapolis, in the county of Hennepin and State of Minnesota, have invented certain new and useful Improvements in Force-Feed Oiling Systems; and I do hereby declare the following to be a full, clear, and exact description of the invention, such as will enable others skilled in the art to which it appertains to make and use the same.

My invention relates particularly to oiling systems for automobiles or motor-propelled vehicles, and is of that general type wherein the grease or oil is forced under pressure from a common supply source to various different bearings, journals and the like through individual delivery pipes.

In certain of these oiling systems, there is a pump or force feed device, operative at will or otherwise to simultaneously deliver, under pressure, the grease or oil to several different bearings or journals. Such systems have been found defective in this, that frequently the oil or grease will harden in one of the delivery pipes or at its place of discharge, so that a force produced in the pump or force feed device will not be effective to force a discharge through such delivery pipe but will produce an excessive discharge through the other pipe or pipes where the resistance is less.

As a salient feature of this invention, I provide a distributor from which the several individual delivery pipes or tubes are extended, and provide a distributor valve, by manipulation of which any one of the delivery pipes may be opened for discharge, at will, while the other distributor pipes are closed or cut off from the pressure produced in the distributor from the pump or force feed device. This provides means whereby any plugged delivery pipe may be opened up and the oil or grease forced therethrough by increasing the pressure in the distributor until it is sufficient to accomplish the object stated.

A commercial form of the oiling system is illustrated in the accompanying drawings, wherein like characters indicate like parts throughout the several views.

Referring to the drawings:

Fig. 4 is an enlarged fragmentary vertical section taken approximately on the line 4—4 of Fig. 2;

Fig. 5 is a vertical section taken approximately on the line 5—5 of Fig. 4;

Fig. 6 is a section on the line 6—6 of Fig. 4;

Fig. 7 is a vertical section taken on the line 7—7 of Fig. 1, some parts being shown in full and some being broken away and particularly illustrating the construction of the so-called oil distributor;

Fig. 8 is a plan view of the distributor shown in Fig. 7; and

Fig. 9 is a horizontal section taken approximately on the irregular line 9—9 of Fig. 7.

Figure 1:
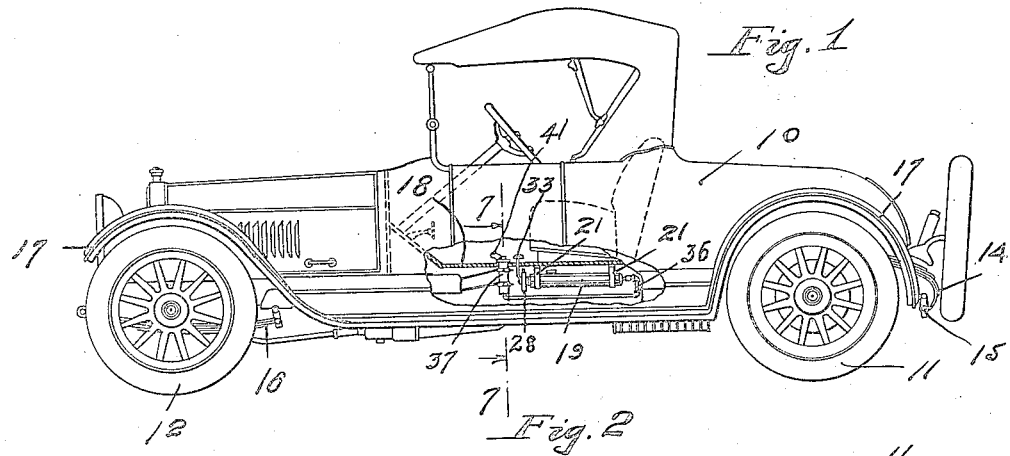
Fig. 1 is a side elevation with some parts broken away showing the lubricating or oiling system applied to an automobile, some parts being broken away.
Figure 2:
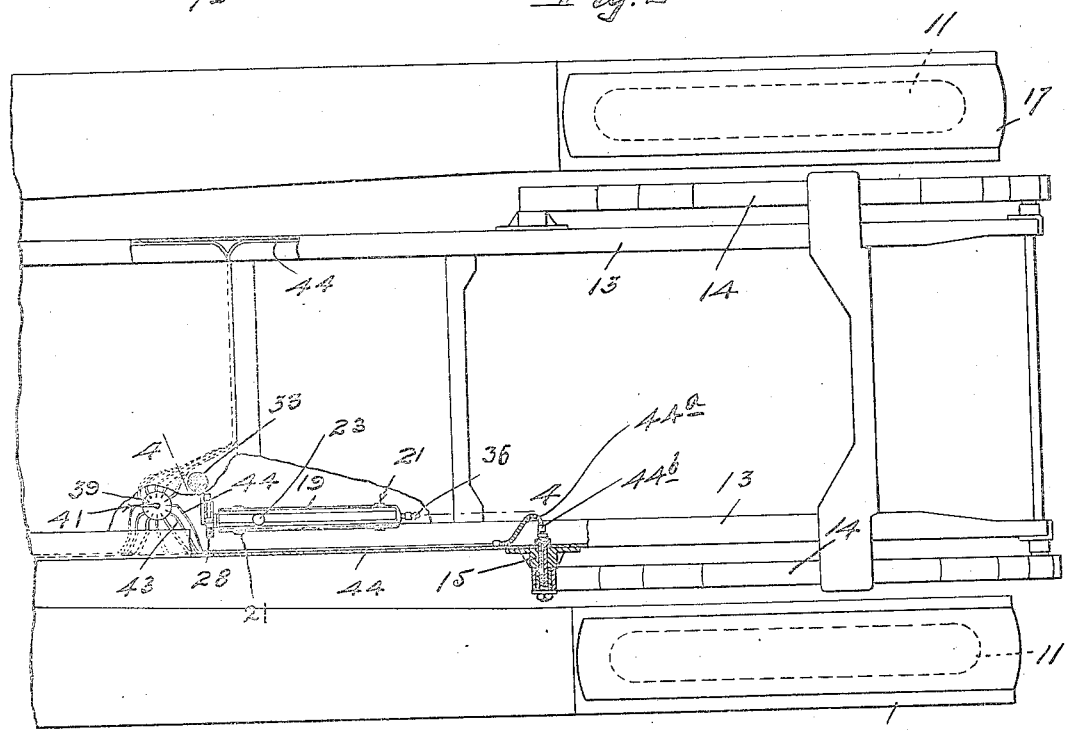
Fig. 2 is a fragmentary plan with some parts broken away and some removed, further illustrating the manner in which the oiling system is applied to the car.

Of the parts of the automobile, it is desirable for the purposes of this case to particularly note only the following parts, to-wit: The body 10, rear wheels 11, front wheels 12, main frame 13, rear springs 14, rear spring shackle bolts 15, front springs 16, fenders 17 and the floor 18 of the body 10. The pump or force feed device comprises a cylinder 19 and a piston 20 working therein. This cylinder 19 is preferably horizontally disposed and rigidly hung from and below the flooring 18 by brackets 21. For filling the cylinder 19 with oil or lubricating grease, it is shown as provided near its receiving end with an upstanding filler neck 22 normally closed by a cap 23. The piston 20 is held against rotation by guide rods 24 extended within and longitudinally of the cylinder 19, and rigidly secured to one head thereof and to a false head 25. The false head 25, (see Fig. 6), has one or more large oil passages 26.

The numeral 27 indicates a feed screw that is extended axially through the cylinder 19, is swiveled in the front head and in the false head 25 thereof and has threaded engagement with the hub of the piston 20 so that the latter will be moved by rotation thereof. A ratchet wheel 28 is rigidly secured to the outer end of the feed screw 27 and is subject to a traveling dog or pawl 29 carried by a lever 30 pivotally mounted on the outer end of said feed screw.

The numeral 31 indicates a plunger or rod that works vertically through the flooring 18 and through a bracket 32 secured to the latter. The lower end of this plunger 31 is suitably connected to the free end of the lever 30 and the upper end thereof, above the flooring, has a head or foot piece 33. A coiled spring 34, (see Fig. 5), reacts against the bracket 32 and against a washer 35 that is fixed to the plunger 31. Thus, the spring 34 normally holds the plunger 31 raised, as indicated by dotted lines in Fig. 5.

The delivery end of the cylinder 19 is connected by a feed pipe 36, to one end, as shown, the lower end, of the cylindrical casing 37 of the oil distributor, (see Figs. 4 and 7, and also Fig. 1). This casing 37 is located below but rigidly supported from the flooring 18 or other relatively fixed part of the vehicle body, and rotatively working within the same is a cylindrical distributing valve 38 that is open at its lower end but provided with a head at its upper end, which, as shown, works closely against a detachable cylinder head 39 applied to the upper end of the casing 37. The head of the valve 38 is rigidly connected to a small axial bolt 40 that is rotatively mounted in the head 39 and is provided above the latter with an arm 41 by means of which the valve 38 may be turned to and set in any one of several or many different positions. As shown, the head 39 is provided with position marks 42 spaced equi-distant and being twelve in number.

Leading from the upper portion of the distributor casing 37 are six individual oil delivery pipes or tubes 43 and, extending from the lower portion thereof, are four similar delivery pipes or tubes 44. Of course, these pipes may vary in number, but, as shown, they are progressively spaced so that one of the twelve pipes extends radially from a position indicated by one of the twelve position marks 42.

With the above arrangement, it is evident that when the arm 41 is aligned with one of the marks 42, a radial port 45 in the upper portion of the valve 38 will be in registration with one or the other of the individual pipes 43, or a lower port 46 in said valve will be in registration with one or the other of the lower pipes 44, but at no time will any two of the said twelve individual pipes be open to the interior of the cylindrical casing 37. Of course, the valve 38 can be set at any one of several intermediate positions, thereby closing all of the pipes 43 and 44 off from communication with the distributor.

Figure 3:
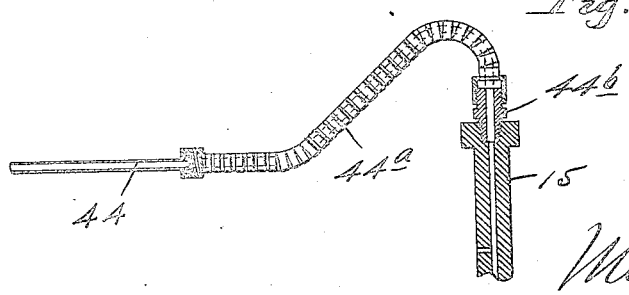
Fig. 3 is a detail partly in plan and partly in horizontal section, illustrating the manner in which one of the oil delivery pipes or tubes is connected to one of the shackle bolts.

The several individual pipes 43 and 44 will be connected to different bearings, journals or the like by suitable connections, but in Fig. 3 I have shown one of the pipes 44 connected to one of the rear spring shackle bolts 15, through a flexible pipe section 44ª and a coupling 44ᵇ. All of said delivery pipe connections will be constantly maintained so that the supply of oil at the different points of delivery may be controlled entirely by the distributing valve 38.

Very high pressure of the oil or lubricating material, within the distributor 37, can be produced by foot power applied to the head 33 of the plunger 31. For ordinary purposes, very high pressure will not be required, but if a pipe should be plugged, the power for producing the desired pressure may be produced by exerting, if necessary, the full weight of the operator on the driving plunger.

When the plunger 31 is forced downward, the dog and ratchet device 29—28 will impart one step of rotary movement to the feed screw 27, which will impart a slight outward movement to the piston 20, thereby crowding the oil or lubricating material out of the cylinder 19, through the pipe 36 and into the distributor casing 37, as already indicated.

Of course, when the piston has reached its extreme position toward the right in respect to Fig. 4, the screw 27 must be rotated backward so as to restore the piston to its initial position, and the cylinder 19 must then be again filled.

From what has been said, it will be understood that the mechanism described and illustrated in the drawings may be modified in many respects, all within the spirit of my invention as herein disclosed and claimed.

What I claim is:

A force feed device including a cylinder and a cooperating piston, a feed screw extending into said cylinder and operative on the piston, a ratchet wheel applied to the outer end of the feed screw, a dog-equipped lever operative on the ratchet wheel, and manually actuated means for reciprocating said lever, in combination with a distributor having a feed pipe connected to the cylinder and having a plurality of individual oil delivery tubes, and a distributing valve in the distributor movable to open, at will, any one of the individual pipes while the others are closed.

In testimony whereof I affix my signature.

GEORGE L. WAHL.